US008849357B2

(12) United States Patent
Houryu

(10) Patent No.: US 8,849,357 B2
(45) Date of Patent: Sep. 30, 2014

(54) MOBILE TERMINAL

(71) Applicant: NEC Casio Mobile Communications, Ltd., Kawasaki (JP)

(72) Inventor: Takeshi Houryu, Kanagawa (JP)

(73) Assignee: NEC Casio Mobile Communications Ltd., Kanagawa (JP)

( * ) Notice: Subject to any disclaimer, the term of this patent is extended or adjusted under 35 U.S.C. 154(b) by 29 days.

(21) Appl. No.: 13/648,739

(22) Filed: Oct. 10, 2012

(65) Prior Publication Data
US 2014/0099996 A1    Apr. 10, 2014

(51) Int. Cl.
H04M 1/00    (2006.01)
H04M 1/02    (2006.01)

(52) U.S. Cl.
CPC ........................................ *H04M 1/02* (2013.01)
USPC ........... 455/566; 455/550.1; 345/1.1; 345/1.3

(58) Field of Classification Search
CPC ................... H04M 1/72519; H04M 1/72583; G06F 3/1423
USPC .............. 455/550.1, 566; 345/1.1–1.3; 349/1; 359/227
See application file for complete search history.

(56) References Cited

U.S. PATENT DOCUMENTS

2008/0186252 A1*    8/2008    Li ................................... 345/1.1

FOREIGN PATENT DOCUMENTS

| JP | 5-5873 A | 1/1993 |
| JP | 5-61031 A | 3/1993 |
| JP | 9-37194 A | 2/1997 |
| JP | 10-39780 A | 2/1998 |
| JP | 2000-347587 A | 12/2000 |
| JP | 2001-005414 A | 1/2001 |
| JP | 2001-350428 A | 12/2001 |
| JP | 2003-50554 A | 2/2003 |

OTHER PUBLICATIONS

Office Action, dated Jun. 24, 2014, issued by the Japanese Patent Office, in counterpart Application No. 2010-230506.

* cited by examiner

*Primary Examiner* — Marcos Torres
(74) *Attorney, Agent, or Firm* — Sughrue Mion, PLLC

(57) ABSTRACT

A mobile terminal according to the present invention includes a first display unit, a second display unit, and a light guide unit. A first internal display area and a second internal display area are arranged to be adjacent to each other via a border. The light guide unit is provided on a side of the first internal display area and the second internal display area. The light guide unit guides display light output from the first display unit and display light output from display light output from the second display unit so that an image displayed on the first internal display area and an image displayed on the second internal display area become a continuous image. Further, the light guide unit has a crystal structure including a plurality of fiber-like crystals.

5 Claims, 3 Drawing Sheets

MOBILE TERMINAL

INCORPORATION BY REFERENCE

This application is based upon Japanese patent application No. 2010-230506, filed on Oct. 13, 2010, the disclosure of which is incorporated herein in its entirety by reference.

BACKGROUND OF THE INVENTION

1. Technical Field The present invention relates to a mobile terminal, and more particularly, to a mobile terminal including a plurality of display units.

2. Background Art

Currently, display panels of mobile devices are advancing in their enlargement of display screens and higher resolution because of the demands to increase the capacity of display data and development of manufacturing techniques. In mobile telephone terminals, display panels of maximum sizes are used within a range that can be stored in terminal cases. Thus, mobile telephone terminals are designed so as to arrange the structures inside the terminals as close as possible and minimize clearances as much as possible. However, it will be required to further enlarge displays of mobile telephone terminals and to include display panels having larger display areas.

On the other hand, the size of a display panel included in a mobile telephone terminal has a trade-off relation with portability of the terminal. Thus, when the size of the display panel is increased, the size of the terminal becomes inevitably larger. In summary, the portability of the mobile telephone terminal is reduced. Accordingly, although it is desired to enlarge the size of the display without reducing portability, it is difficult to achieve both of the portability and enlargement of the screen by one display panel. In order to overcome this situation, techniques to enlarge the display area by displaying one image using a plurality of display panels have been developed.

Japanese Unexamined Patent Application Publication No. 2001-5414 discloses a multi-display apparatus including a plurality of inclined films and a transparent member on display surfaces of two flat display panels. By proving the transparent member between the plurality of inclined films, the paths of display light passing through the transparent members are directed to the direction of a border between the flat display panels. Accordingly, the display light around the border is radiated on the border, which makes it possible to prevent the display area from being separated by the border at the time of the display.

Japanese Unexamined Patent Application Publication No. 2001-350428 discloses a display apparatus including a lens array and a deflection element on the side of display surfaces of two LCDs (Liquid Crystal Displays) arranged with a gap therebetween. The lens array converts display light of one LCD into parallel light. Then, the deflection element deflects the parallel light in the direction of the other LCD. Accordingly, the gap between the two LCDs is not displayed, whereby one continuous image is displayed by the two LCDs.

However, the multi-display apparatus disclosed in Japanese Unexamined Patent Application Publication No. 2001-5414 includes a plurality of inclined films on the side of the front surface of the screen. Accordingly, there is a problem that a stripe or grid-like pattern is displayed on the display area because of the existence of the inclined films, and the image displayed on the display area is differently seen.

Further, the display apparatus disclosed in Japanese Unexamined Patent Application Publication No. 2001-350428 is required to input the parallel light to the deflection element. Accordingly, it is required to separately provide a lens array to convert the display light of the LCD into the parallel light, and the thickness of the display apparatus as a whole increases. In short, portability is reduced.

The present invention has been made in order to solve such problems, and aims to provide a mobile terminal which is capable of achieving large screen display while maintaining image quality and portability.

SUMMARY

A mobile terminal according to the present invention includes: a first display unit including a first display area; a second display unit including a second display area arranged to be adjacent to the first display area via a border; and a light guide unit provided on a side of the first display area and the second display area, the light guide unit guiding display light output from the first display unit and display light output from the second display unit so that an image displayed on the first display area and an image displayed on the second display area become a continuous image, in which the light guide unit has a crystal structure including a plurality of fiber-like crystals.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENTS

First Exemplary Embodiment

Figure 1:
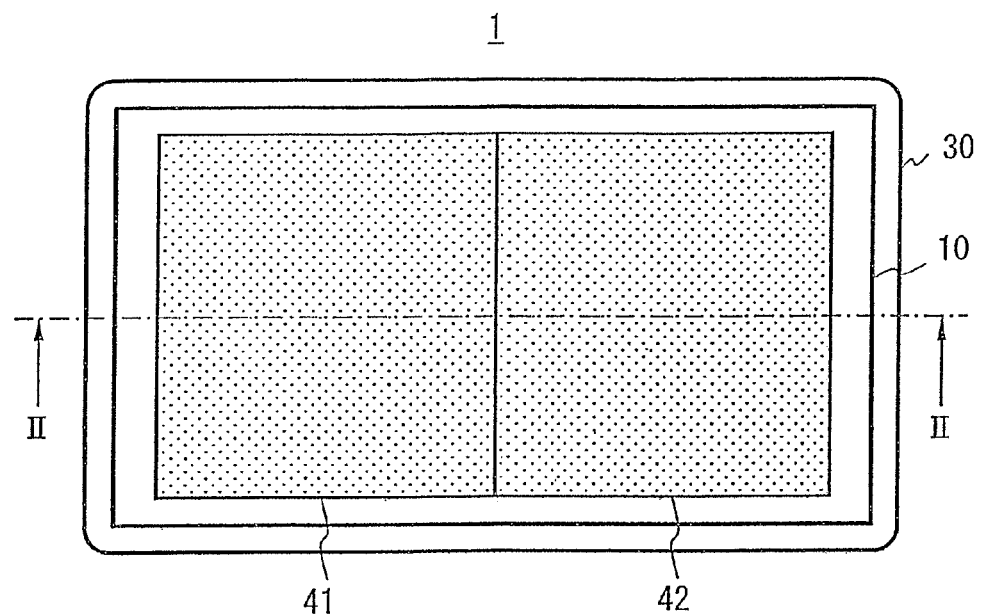
FIG. 1 is an upper view of a mobile terminal according to a first exemplary embodiment.
Figure 2:
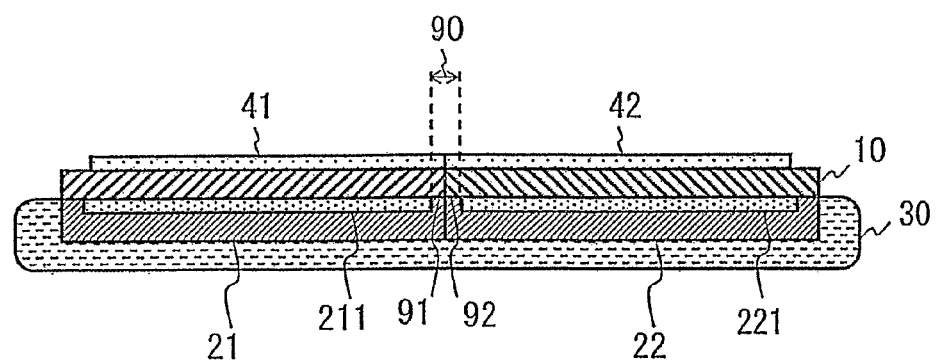
FIG. 2 is a cross-sectional view of the mobile terminal according to the first exemplary embodiment.

Hereinafter, with reference to the drawings, exemplary embodiments of the present invention will be described. FIG. 1 is a diagram showing an upper view of a mobile terminal 1 according to this exemplary embodiment. FIG. 2 is a cross-sectional view in the arrow direction along the line II-II of FIG. 1. The mobile terminal 1 includes a light guide unit 10, a first display unit 21, a second display unit 22, and a case 30. The mobile terminal may be, for example, a mobile telephone, a portable audio player, a portable game machine.

The first display unit 21 and the second display unit 22 are stored in the case 30, and are arranged to be adjacent to each other. The first display unit 21 outputs display light to display an image from a first internal display area 211 (first display area) to a first external display area 41. The second display unit 22 similarly outputs display light to display an image from a second internal display area 221 (second display area) to a second external display area 42. The first display unit 21 and the second display unit 22 are LCDs, for example. The first internal display area 211 and the second internal display area 221 mean areas in the first display unit 21 and the second display unit 22 where display light (images) output from the first display unit 21 and the second display unit 22 are displayed. The first external display area 41 and the second external display area 42 mean areas on the light guide unit 10 where images are actually displayed, i.e., areas where a user of the mobile terminal 1 actually recognizes the images.

At this time, it is required to provide a frame around the first internal display area 211 (right and left areas of the first internal display area 211 in FIG. 2) in the first display unit 21 because of the necessity of pixel lines and the like. It is also required to provide a frame in the second display unit 22 as well. Accordingly, the first internal display area 211 and the second internal display area 221 are arranged to be adjacent to each other via a border 90 of a frame 91 and a frame 92.

The light guide unit 10 is provided on the side of the display surfaces of the first display unit 21 and the second display unit 22, i.e., the side of the first internal display area 211 and the second internal display area 221. It is preferable that reinforcement processing is performed on the light guide unit 10. By performing reinforcement processing, the light guide unit 10 itself may be used as a display screen of the mobile terminal 1. Accordingly, there is no need to additionally provide a display screen and it is possible to decrease the number of elements of the mobile terminal 1.

The light guide unit 10 guides display light output from the first display unit 21 and the second display unit 22 so that the image displayed on the first internal display area 211 and the image displayed on the second internal display area 221 become a continuous image. In summary, the light guide unit 10 guides display light so that the first external display area 41 and the second external display area 42 contact with each other on the surface of the light guide unit 10. In this exemplary embodiment, the light guide unit 10 may be formed of two elements separated at the border of the first external display area 41 and the second external display area 42, or may be formed of a single member which is not separated at the border.

Figure 3:
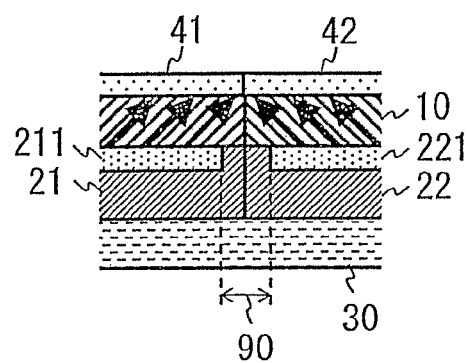
FIG. 3 is a partially enlarged cross-sectional view of the mobile terminal according to the first exemplary embodiment.

Specifically, the light guide unit 10 displays the display light output from the first internal display area 211 while shifting the display light in the direction of the border 90 (right side in FIG. 2). On the other hand, the light guide unit 10 displays the display light output from the second internal display area 221 while shifting the display light in the direction of the border 90 (left side in FIG. 2). More specifically, the light guide unit 10 guides display light output from the first internal display area 211 and the second internal display area 221 in oblique upward directions (the arrow directions in FIG. 3). FIG. 3 is an enlarged cross-sectional view of an area around the border 90.

Accordingly, the mobile terminal 1 is able to continuously display the images displayed on the first internal display area 211 and the second internal display area 221 in the upper side of the border 90. In FIGS. 2 and 3, the first external display area 41 and the second external display area 42 are contacted with each other at the center of the border 90. Accordingly, the user of the mobile terminal 1 cannot see the border 90 between the images displayed on the first external display area 41 and the second external display area 42. In short, the user sees one large display of the first external display area 41 and the second external display area 42. As a matter of course, the images displayed on the first external display area 41 and the second external display area 42 are the same to the images displayed on the first internal display area 211 and the second internal display area 221.

Further, the light guide unit 10 has a crystal structure including a plurality of fiber-like crystals. For example, the light guide unit 10 is formed of Ulexite or the like. The display light output from the first internal display area 211 passes through fiber-like crystals of the light guide unit 10, and then displayed on the first external display area 41. In the similar way, the display light output from the second internal display area 221 passes through fiber-like crystals of the light guide unit 10, and then displayed on the second external display area 42.

At this time, the plurality of fiber-like crystals included in the light guide unit 10 are so minute that the user cannot visually recognize each of them. Accordingly, a stripe or grid-like pattern cannot be seen in the images displayed on the first external display area 41 and the second external display area 42 via the light guide unit 10.

In addition, the light guide unit 10 conducts the display light by causing the display light to pass through the fiber-like crystals. In other words, the light guide unit 10 is not a deflection element that deflects display light. Accordingly, it is not required to convert the display light into parallel light before the display light output from the first internal display area 211 and the display light output from the second internal display area 221 are input to the light guide unit 10.

It is preferable that the plurality of fiber-like crystals included in the light guide unit 10 have a uniform thickness of fibers and are arranged substantially in parallel with respect to the light guide direction. Accordingly, it is possible to move the images displayed on the first internal display area 211 and the second internal display area 221 to the first external display area 41 and the second external display area 42 in a parallel direction. In summary, the sizes of the pixels and the positional relation of the pixels of the images are maintained before and after the passage through the light guide unit 10.

As described above, in the mobile terminal 1 according to this exemplary embodiment, the light guide unit 10 guides the display light output from the first display unit 21 and the second display unit 22 so that the image displayed on the first internal display area 211 and the image displayed on the second internal display area 221 become a continuous image. Accordingly, even with the border 90 between the first internal display area 211 and the second internal display area 221, the image displayed on the first external display area 41 and the image displayed on the second external display area 42 become a continuous image. Accordingly, the mobile terminal 1 is able to display the image as one large image which has no border 90.

Further, the plurality of fiber-like crystals forming the light guide unit 10 are so small that the user cannot visually recognize them. Accordingly, there is no case that stripe or grid-like lines are seen in the images displayed on the first external display area 41 and the second external display area 42. Therefore, the image quality can be maintained.

In addition, each of the crystals conducts the display light like an optical fiber instead of deflecting the display light like a lens. Accordingly, it is possible to directly conduct the display light (diffused light) output from the first internal display area 211 and the second internal display area 221. Accordingly, it is not required to include a lens or the like to convert the display light into parallel light and it is possible to prevent the mobile terminal 1 from being thick. Accordingly, portability of the mobile terminal 1 can be maintained.

Second Exemplary Embodiment

Figure 4:
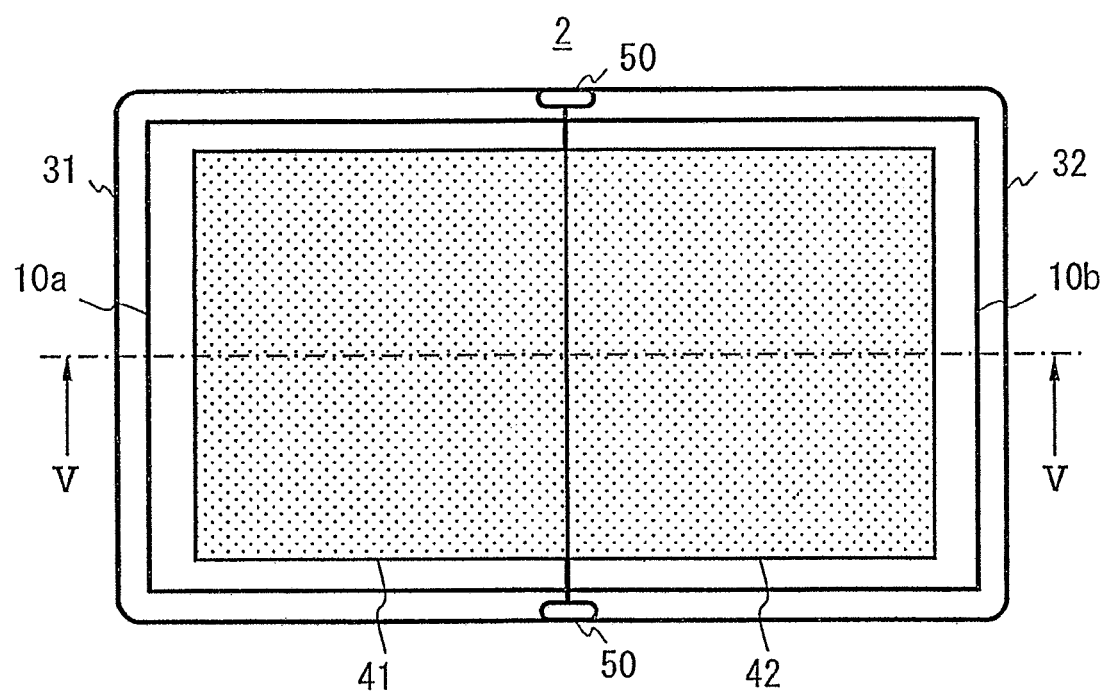
FIG. 4 is an upper view of a mobile terminal according to a second exemplary embodiment.
Figure 5:
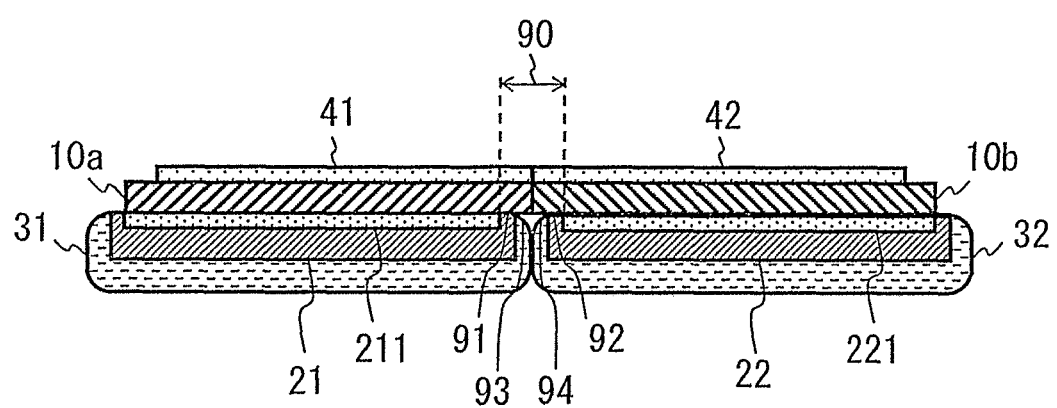
FIG. 5 is a cross-sectional view of the mobile terminal according to the second exemplary embodiment.

A second exemplary embodiment of the present invention will be described. FIG. 4 is a diagram showing an upper view of a mobile terminal 2 according to this exemplary embodiment. FIG. 5 is a cross-sectional view in the arrow direction along the line V-V of FIG. 4. The mobile terminal 2 includes a first case 31 and a second case 32 in place of the case 30 included in the mobile terminal 1 shown in FIG. 1. Other structures are similar to those of the mobile terminal 1, and thus description thereof will be omitted.

The first display unit 21 is stored in the first case 31. The second display unit 22 is stored in the second case 32. The first case 31 and the second case 32 are coupled by a hinge 50 so that they can be folded.

Accordingly, the mobile terminal 2 includes a frame 93 of the first case 31 and a frame 94 of the second case 32 between the first display unit 21 and the second display unit 22. Thus, in the mobile terminal 2, the part including the frame 93 of the first case 31 and the frame 94 of the second case 32 in addition to the frame 91 of the first display unit 21 and the frame 92 of the second display unit 22 serves as the border 90.

As described above, the first case 31 and the second case 32 can be folded in the mobile terminal 2. Accordingly, a light guide unit 10a is provided on the first case 31 and a light guide unit 10b is provided on the second case 32. Accordingly, the light guide unit is not formed of a single member, but is separated into the light guide unit 10a and the light guide unit 10b on the border of the first case 31 and the second case 32. Further, in a state in which the mobile terminal 2 is open, the edge position of the light guide unit 10a is designed to match the edge position (the side of the hinge 50) of the first case 31, and the edge position of the light guide unit 10b is designed to match the edge position (the side of the hinge 50) of the second case 32.

Also in this exemplary embodiment, the light guide units 10a and 10b guide display light in the similar way as in the first exemplary embodiment. More specifically, the light guide unit 10a guides display light output from the first internal display area 211 to a part near the edge of the first case 31 (the side of the hinge 50). In the similar way, the light guide unit 10b guides display light output from the second internal display area 221 to a part near the edge of the second case 32 (the side of the hinge 50). In other words, the light guide units 10a and 10b guide display light output from the first display unit 21 and the second display unit 22 so that two images displayed on the first internal display area 211 and the second internal display area 221 become a continuous image.

As described above, in the mobile terminal 2 according to this exemplary embodiment, the first case 31 storing the first display unit 21 and the second case 32 storing the second display unit 22 are coupled by the hinge 50 so that they can be folded. Thus, the mobile terminal 2 can be folded when the user carries the mobile terminal 2. Thus, portability can be improved. As a matter of course, since the mobile terminal 2 includes the light guide units 10a and 10b, the images displayed on the first external display area 41 and the second external display area 42 are continuous. Thus, the mobile terminal 2 is able to achieve large screen display. In addition, it is possible to maintain the image quality as is similar to the mobile terminal 1 according to the first exemplary embodiment, and to prevent the mobile terminal 2 from being thick.

Other Exemplary Embodiments

Other exemplary embodiments according to the present invention will be described. While normal display apparatuses such as LCDs are used in the first display unit 21 and the second display unit 22 in the first and second exemplary embodiments described above, a glass plate included in an LCD may be used as the light guide unit 10. More specifically, the typical LCD includes liquid crystals held between two glass plates. Among the glass plates, the glass plate which is in the side of the display surface may be the light guide unit 10 on which reinforcement processing is performed. Accordingly, the light guide unit 10 used in the display screen of the mobile terminal and the light guide unit 10 used in the glass plate are overlapped, whereby a configuration of including double light guide units 10 is achieved. As a result, the display light can be guided by two steps by the light guide unit 10 used as the glass plate of the LCD and the light guide unit 10 used as the display screen. Accordingly, the image can be displayed in a position which is further apart from the first display unit 21 and the second display unit 22 compared to a case in which the light is guided by one light guide unit 10.

Further, while the light guide unit 10 is used as the display screen in the first and second exemplary embodiments described above, a normal element may be used as the display screen and a film having the similar crystal structure as the light guide unit 10 may be attached to the display screen.

Note that the present invention is not limited to the exemplary embodiments stated above, but can be changed and combined as appropriate without departing from the spirit of the present invention. For example, the number of display units is not limited to two.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile terminal comprising:
   a first display unit comprising a first display area;
   a second display unit comprising a second display area arranged to be adjacent to the first display area via a border; and
   a light guide unit provided on a side of the first display area and the second display area, the light guide unit configured to guide display light output from the first display unit and display light output from the second display unit so that an image displayed on the first display area and an image displayed on the second display area
   wherein the light guide unit has a crystal structure including a plurality of crystals structured fibers, and
   wherein the light guide unit is formed of Ulexite.

2. The mobile terminal according to claim 1, wherein the light guide unit is further configured to guide the display light output from the first display unit and display light output from the second display unit while maintaining sizes of the images displayed by the first display unit and the second display unit.

3. The mobile terminal according to claim 1, further comprising a plurality of light guide units,
   wherein the plurality of light guide units are arranged to be overlapped with each other, and are configured to guide the display light output from the first display unit and display light output from the second display unit so that the image displayed on the first display area and the image displayed on the second display area become a continuous image.

4. The mobile terminal according to claim 1, wherein
   the first display unit is stored in a first case and the second display unit is stored in a second case which is different from the first case, and
   the first case and the second case are coupled by a hinge part so that the first case and the second case can be folded.

5. The mobile terminal according to claim 1, wherein the light guide unit is subjected to reinforcement processing.

* * * * *

UNITED STATES PATENT AND TRADEMARK OFFICE
CERTIFICATE OF CORRECTION

| | |
|---|---|
| PATENT NO. | : 8,849,357 B2 |
| APPLICATION NO. | : 13/648739 |
| DATED | : September 30, 2014 |
| INVENTOR(S) | : Houryu |

It is certified that error appears in the above-identified patent and that said Letters Patent is hereby corrected as shown below:

In the Claim

Column 6, Line 38: Claim 1, delete "area" and insert -- area become a continuous image, --

Signed and Sealed this
Thirty-first Day of March, 2015

Michelle K. Lee
*Director of the United States Patent and Trademark Office*